Figure 1:
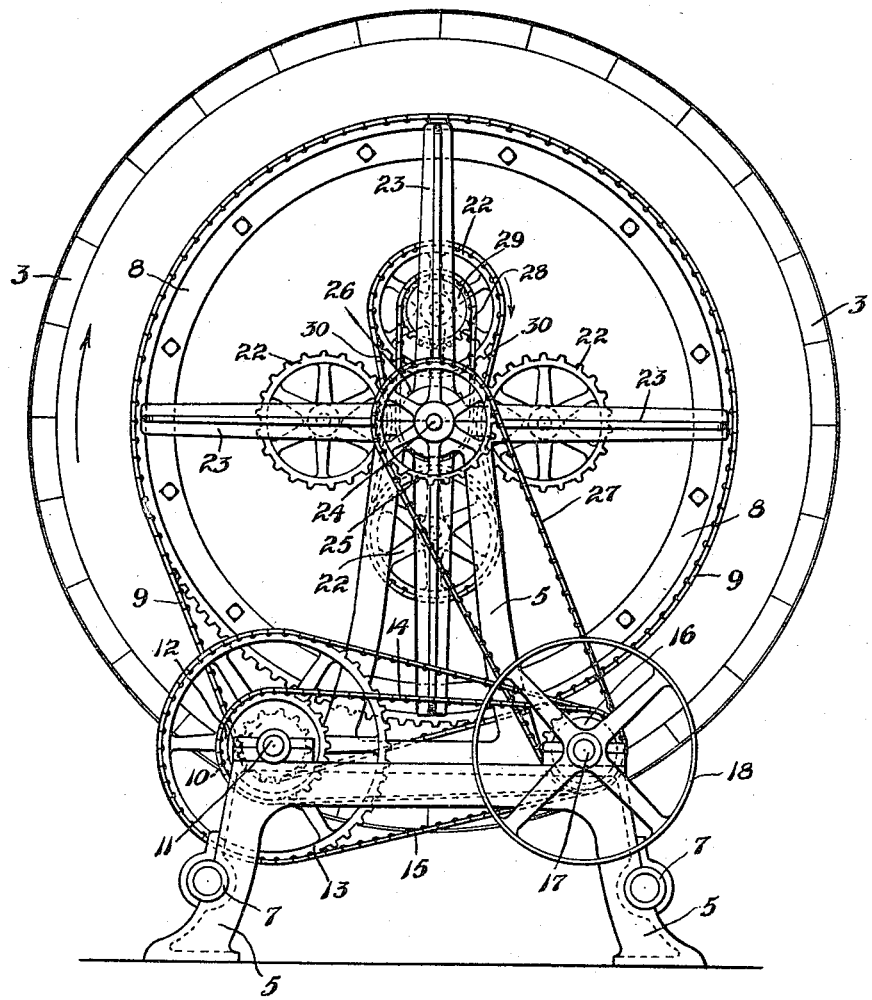

R. B. DISBROW.
COMBINED CHURN AND BUTTER WORKER.
APPLICATION FILED SEPT. 8, 1919.

1,322,675.

Patented Nov. 25, 1919.
2 SHEETS—SHEET 1.

INVENTOR.
R.B. DISBROW,
BY HIS ATTORNEYS.

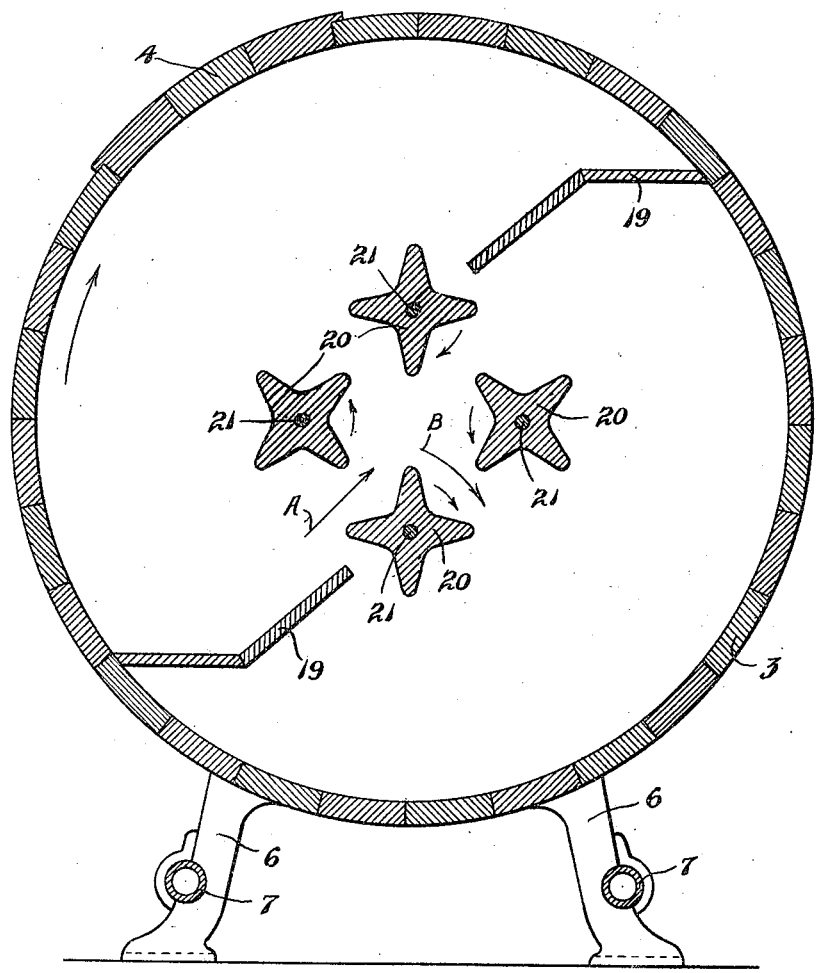

UNITED STATES PATENT OFFICE.

REUBEN B. DISBROW, OF ST. PAUL, MINNESOTA.

COMBINED CHURN AND BUTTER-WORKER.

1,322,675. Specification of Letters Patent. Patented Nov. 25, 1919.

Application filed September 8, 1919. Serial No. 322,252.

*To all whom it may concern:*

Be it known that I, REUBEN B. DISBROW, a citizen of the United States, residing at St. Paul, in the county of Ramsey and State of Minnesota, have invented certain new and useful Improvements in Combined Churn and Butter-Workers; and I do hereby declare the following to be a full, clear, and exact description of the invention, such as will enable others skilled in the art to which it appertains to make and use the same.

My invention has for its object to provide an improved combined churn and butter worker; and to such ends, generally stated, the invention consists of the novel devices and combinations of devices hereinafter described and defined in the claims.

The invention consists of a novel relative arrangement of drum, working rollers, lifting flights and driving connections whereby the butter will be worked four times in each rotation of the drum. This result is obtained by the use of two lifting flights and four working rollers grouped around the axis of the drum and driven so as to cause the butter to be worked twice between rollers, under the upward movement of each flight or four times for each complete rotation of the drum.

A commercial form of this combined churn and butter worker is illustrated in the accompanying drawings wherein like characters indicate like parts throughout the several views.

Referring to the drawings:—

Figure 1 is an end elevation of the machine showing particularly the driving connection for the drum and rollers; and Fig. 2 is a transverse vertical section taken through the intermediate portion of the drum.

The drum 3, which is of the usual construction provided with an ordinary door 4, is mounted to rotate on the horizontal axis in a well known manner on suitable end pedestals 5 and 6 connected by tie bars 7. On one head, the drum 3 is provided with a large annular sprocket 8. A sprocket chain 9 runs over the sprocket 8 and over a small sprocket 10 on a counter shaft 11 journaled to the end frame 5. The shaft 11 also carries sprockets 12 and 13. Sprocket chains 14 and 15 run, respectively, over sprockets 11 and 12 and over laterally spaced sprockets 16 on shaft 17, also journaled in end frame 5. There are three of the sprockets 16 laterally spaced on shaft 17, but as the two chains 14 and 15 and the coöperating sprockets are for the relative low and high speeds of the drum, respectively, for butter working and churning actions, and are of the well known arrangement, it is sufficient for the purposes of this case to state that they are intended to rotate the drum in the direction of the arrows marked thereon in Fig. 1, when the shaft 17 is driven in the same direction, to wit, in a clockwise direction in respect to Fig. 1. For rotating the shaft 17 in the direction stated, it is provided with a pulley 18 over which a power driven belt, not shown will run.

Located within the drum in diametrically opposite arrangement, are two butter lifting flights or shelves 19 that deliver the butter on the rising side of the drum to a group of four deeply corrugated paddle-like working rollers 20. These rollers 20 are spaced equidistant from the axis of the drum and are grouped around the drum in rectangular arrangement, and their shafts 21 are provided outside of the drum head with sprocket wheels 22. All of these sprockets 22 are inside of the arms of the spider-like bracket 23 shown as secured to the annular sprocket 8. Journaled in the bracket 23 at the axis of the drum, is a short counter shaft 24 which, outside of the bracket, is provided with a sprocket 25 and inside of said bracket is provided with a sprocket 26. A sprocket chain 27 runs over the outside sprocket 25 and over one of the three elements 16 on the driving shaft 17. A short sprocket chain 28 runs over the inside sprocket 26 and over a sprocket 29 that is secured to one of the roller shafts 21 outward of its sprocket 22 but inside of the bracket 23. A sprocket chain 30 runs over the sprocket 22 of the roller shaft 21 that is equipped with a sprocket 29, and also over the sprocket 22 of the diametrically opposite roller shaft 21. This chain 30 runs against the inner sides of the other two sprockets 22 so that the four rollers 20 will be driven in the direction of the arrows marked adjacent thereto on Fig. 2. By reference to Fig. 2, it will be noted that the two vertically spaced rollers are driven in a clockwise direction while the two horizontally spaced rollers are driven in an anti-clockwise direction, this statement being made, of course, only in respect to the particular position of the rollers shown in Fig. 2. The importance of the grouping of the rollers and of the driving of the same, as described, will appear in the description of the operation.

Clutches, and the like, for throwing the rollers into and out of action, arranged substantially as used in any of the well known driving connections in combined churns and butter workers, may be employed and it will, of course, be understood that, in the churning action, it is not necessary to drive the rollers, but that they must be driven in the butter working action. The chain action is obvious, but the butter working action, which involves a new operation and a highly improved result, is as follows:

On the rising side of the drum, the butter will be lifted by the upwardly moving flight or shelf 19 and will be delivered between two oppositely moving rollers, first as indicated by the arrows marked $a$ on Fig. 2, and second, between oppositely rotating rollers, as indicated by the arrows marked $b$ on Fig. 2. Thus it will be seen that the butter, in the upward movement of the first noted flight and under the first half rotation of the drum, will twice be worked between coöperating reversely rotating working rollers. On the second half rotation of the drum, the same action takes place between the other two rollers, so that under a complete rotation of the drum, the butter will be worked four times between coöperating reversely rotating rollers. This gives a much better butter working action than hitherto accomplished with the butter workers known to me. Moreover, the result is accomplished by an extremely simple construction and by very desirable equi-distant grouping of the rollers around the axis of the drum whereby an approximately constant continuous and even butter working action is produced.

In the drawings I have, in a general way, illustrated means for high and low speeds of the drum, respectively, for the churn and butter worker actions, but in practice, I do not believe that this two-speed is required, because the plurality of rollers, co-acting with the lifting flights, which act as dashers in the churning action produce such great agitation of the milk that I believe that churning at maximum speed and maximum efficiency as to separation of the butter fat, may be accomplished by running the drum at the lower speed with the rollers in action to produce the churning action. In fact, too high speed of the drum in the churning action has a tendency to defeat the object, to wit, rapid churning, because of the centrifugal action tending to cause the milk to cling to the drum.

What I claim is:

1. The combination with a rotary drum having diametrically opposite flights, of a group of four rollers spaced around the axis of the drum in position to receive from said flights on the rising side of the drum, and means for driving said drum and rollers in a direction to cause the butter to be worked four times between coöperating rollers for each rotation of the drum.

2. The combination with a drum arranged to rotate on an approximately horizontal axis, of diametrically opposite lifting flights within said drum, a group of four corrugated working rollers spaced equi-distant around the axis of the drum in position to receive from said flights on the rising side of the drum, means for rotating said drum, means for rotating two of said rollers in the same direction as the drum, and means for rotating the other two rollers in the opposite direction, whereby the butter will be worked four times between coöperating rollers for each rotation of the drum.

3. The combination with a drum mounted to rotate on an approximately horizontal axis, of diametrically opposite lifting flights within said drum, a group of four corrugated working rollers journaled to the heads of the drum and spaced equi-distant around the axis of the drum, said rollers having driving shafts extending through one head of the drum, and driving connections outside of the drum including means for rotating the drum in one direction, means for rotating two diametrically opposite members of said rollers in the same direction as the drum, and means for rotating the other two diametrically opposite members of said rollers in the opposite direction, whereby the butter will be worked four times between coöperating working rollers for each rotation of the drum.

4. The combination with a drum mounted to rotate on an approximately horizontal axis, of diametrically opposite lifting flights within said drum, a group of four corrugated working rollers journaled to the heads of the drum and spaced equi-distant around the axis of the drum, said rollers having driving shafts extending through one head of the drum, and driving connections outside of the drum comprising sprockets on the outer edges of the roller shafts, a counter shaft at the axis of the drum, means for driving said counter shaft, a sprocket running over diametrically opposite roller sprockets and against the inner portions of the other two diametrically opposite roller sprockets, and means for driving one of said roller shafts from said axial counter shaft.

In testimony whereof I affix my signature in presence of two witnesses.

REUBEN B. DISBROW.

Witnesses:
BERNICE G. BAUMANN,
HARRY D. KILGORE.